UNITED STATES PATENT OFFICE.

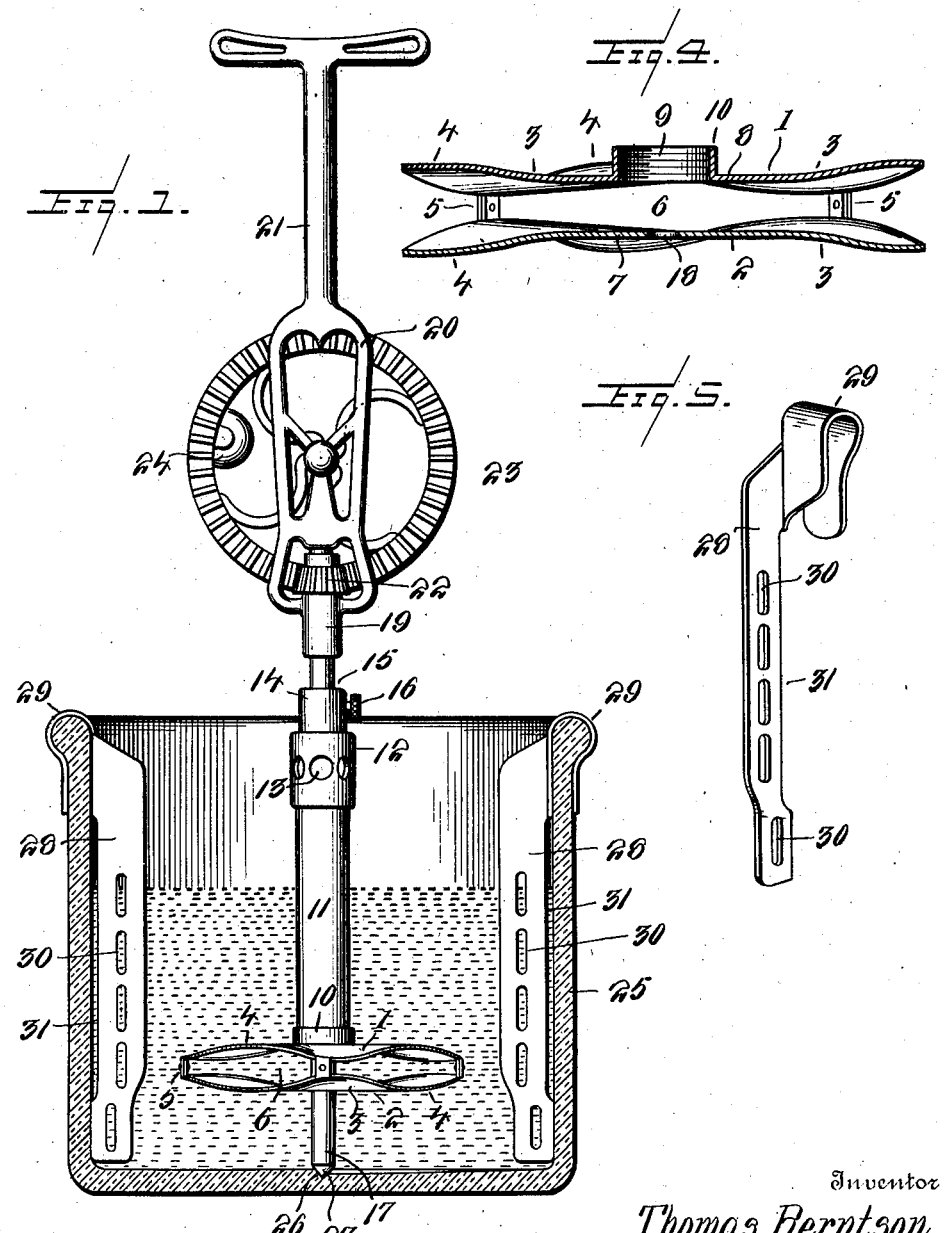

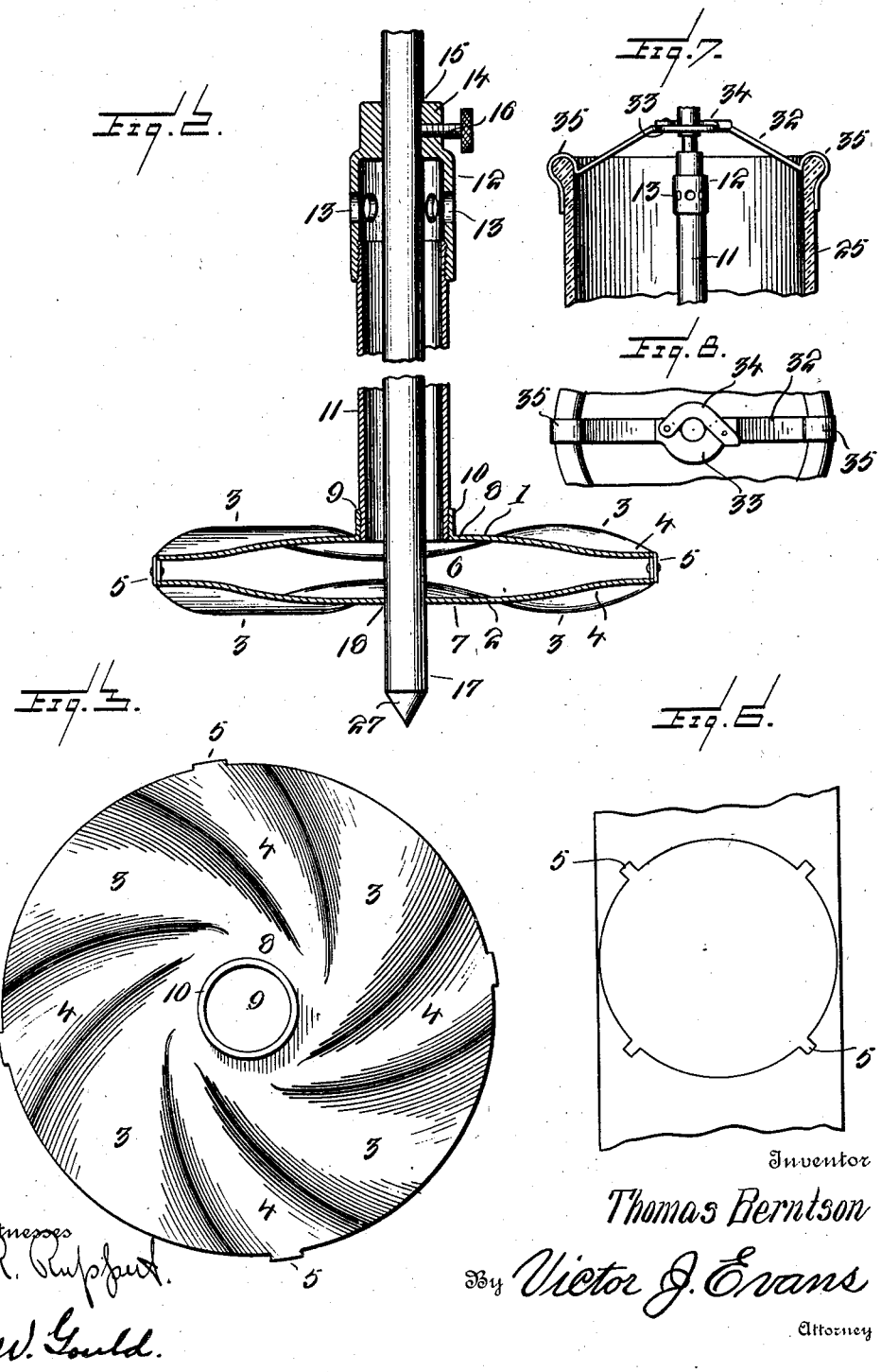

THOMAS BERNTSON, OF PITTSBURG, PENNSYLVANIA, ASSIGNOR TO J. WORTH CARNA-HAN, OF WASHINGTON, DISTRICT OF COLUMBIA, AND F. C. PARK, OF PITTSBURG, PENNSYLVANIA.

VACUUM CHURN APPARATUS.

975,380.  Specification of Letters Patent.  Patented Nov. 8, 1910.

Application filed April 1, 1910. Serial No. 552,887.

*To all whom it may concern:*

Be it known that I, THOMAS BERNTSON, a citizen of the United States, residing at Pittsburg, in the county of Allegheny and State of Pennsylvania, have invented new and useful Improvements in Vacuum Churn Apparatus, of which the following is a specification.

The invention relates to an improvement in churn apparatus, being more particularly directed to a device which may be introduced into any suitable type of vessel containing a quantity of cream and manually operated to simultaneously agitate and aerate said material to separate the butter fat therefrom.

The main object of the present invention is the provision of spaced specifically-formed plates designed to be introduced into a body of cream and rotated therein through the use of any preferred type of manually operable or power mechanisms, the plates being formed to create a vacuum during such rotation and the space between the plates having direct communication with the atmosphere beyond the body of cream, whereby in the rotation of said plates the creation of the vacuum serves to continuously draw currents of air into the material for the purposes of aeration and at the same time induce the desired agitation.

A further object of the invention is the provision of auxiliary deflecting or current interrupting means designed for use in connection with the improved churn apparatus, and in the use of which the rotary current imparted to the cream by the rotation of the plates is interrupted with the effect to direct the cream continually toward the plates and insure a more thorough aeration and agitation of the same.

The invention in its preferred details of construction will be described in the following specification, reference being had particularly to the accompanying drawings, in which:—

Figure 1 is a view in elevation, partly in section of the improved churn apparatus. Fig. 2 is an enlarged vertical sectional view of the apparatus detached, the drive rod being shown in elevation and the power means omitted. Fig. 3 is a plan view of one of the plates. Fig. 4 is a vertical sectional view through the aerating. Fig. 5 is a perspective view of one of the current interrupting members. Fig. 6 is a view of the blank from which the plates are stamped. Fig. 7 is a broken view in elevation, partly in section, showing a means for supporting the churn apparatus in position in the vessel. Fig. 8 is a broken plan of the same.

Referring particularly to the accompanying drawings, the improved churn apparatus comprehends specifically the combination of a few simple parts arranged for ready separation for cleaning purposes and for close storage when not desired for use, the apparatus as a whole being designed for coöperation with any type of vessel suitable for holding the desired quantity of cream.

In the preferred embodiment of details, the improved device may be said to include an aerating section and means for rotating or revolving the same within the material.

The aerating section comprises duplicate upper and lower plates 1 and 2, secured together to produce a vacuum-forming member. These plates which in plan are of disk or circular form, are so constructed that their edges follow a regular sinuous outline, that is, present a series of alternate elevations and depressions, as 3 and 4, beyond the normal edge plane of the disk. The line of coincidence between a depression, as 4, and an elevation as 3, adjacent thereto does not extend radially of the disk but in effect tangentially thereof. Each disk, preferably coincident with the lowest portions of the depressions in the upper disk and of the elevations in the lower disk, is formed with radially projecting ears 5 designed to be bent at right angles to the plane of the disk. The disks are secured together to provide the aerating member by securing the ears 5 in fixed relation to each other so as to space the plates apart. In this arrangement of the plate the elevation 3 of the upper plate is arranged above and vertically opposite the depression 4 of the lower plate, so that when connected the aerating member presents a central opening or chamber 6 which opens through the edge of the member and which edge opening presents an alternate series of widened and narrowed spaces, as will be clear from Fig. 1. The central portion of the lowermost plate presents a comparatively flat section 7 disposed in the normal plane of the disk, the upper plate presenting a similar section 8 centrally formed with an opening 9 and provided with an annular flange 10, preferably integral with the plate and forming the wall of the opening. A sleeve member 11 is removably connected, preferably by threaded connection with the flange 10, which sleeve is of such length as to extend above the level of the cream when the device is in use. The upper end of the sleeve is provided with a tubular section 12 preferably threaded onto or otherwise removably connected with the sleeve. The tubular section 12 is formed with an annular series of openings 13, and the wall of the section above the openings is materially thickened to form a bearing portion 14 having a central opening 15 of materially less diameter than the interior diameter of the tubular section and sleeve, and carrying a set screw 16.

The aerating member is designed for removable connection to and mounted upon what may be termed a power rod 17, which rod passes through the opening 15 in the tubular section, lengthwise the sleeve 11 and through the aerating member, the plane portion 7 or lower plate being formed with an opening 18 to permit such passage. The aerating member is designed to be secured at any desired or appropriate height upon the rod 17, and fixed thereto in a manner to permit convenient removal through obvious use of the set screw 16.

The power rod is designed to be rotated in any appropriate manner and through the use of any desired mechanism. For convenience, the present apparatus is illustrated as a hand instrument, and as a convenient operating means for the power rod, I have shown the upper end of the said rod mounted in a bearing 19 from which rises a bracket 20 carrying a handle extension 21. A double pinion 22 is fixed upon the rod 17 immediately adjacent the bearing 19 and is engaged by a beveled power gear 23 mounted in the bracket 20 and operated by the usual handle 24. In this specific arrangement, which as previously stated is merely illustrative of one type of driving means the pinion 22 and gear 23 are to be of such relative sizes as to impart the desired speed to the aerating member without necessitating unusual exertion on the part of the operator. Former experience has demonstrated that the proportion between these gears of about eight to one produces satisfactory results.

In the use of the apparatus, a vessel 25 of any desired type is supplied with a suitable quantity of cream, and the device is introduced into said vessel so that the aerating member, or more particularly the plates thereof are well below the surface of the cream. If desired, the vessel may be formed with a bearing depression 26 and the lower end of the rod 17 appropriately formed to fit therein, as at 27, whereby the lower end of the device is held against lateral movement and the operation of the apparatus thereby facilitated. In the rapid rotation of the plates, the cream will be forced into a rotary current and in a direction away from the plates. This movement of the cream between the plates, by reason of the alternate wide and narrow outlets tends to create a vacuum within the chamber 6 with the effect to draw a very considerable quantity of air through the openings 13 in the tubular section, through the sleeve 11, and into the chamber 6 to thoroughly aerate the material. This aeration together with the agitation resulting from the movement of the parts tends to a speedy and effective separation of the butter fats, as will be obvious to one skilled in the theory of butter production. To facilitate such separation in point of time, I provide and prefer to use what I term current interrupters, illustrated more particularly in Fig. 5. These interrupters, of which any number desired may be used, are preferably comparatively narrow metallic strips 28 having a length approximately equal to the height of the vessel and preferably formed at the upper end with offset clips 29 to engage the upper edge of the vessel and secure the interrupters against the side wall thereof. These interrupters are formed with a series of elongations 30 and for a portion of their length on the rear edge are cut away so as to provide a longitudinal passage 31 between the interior surface of the vessel and the approximate edge of the interrupter. When in place these interrupters tend to break the rotary current of the cream and thereby increase the agitating and aerating effect of the apparatus, the interrupting tendency serving to direct the material back toward the center.

In Figs. 7 and 8, I have shown a simple means whereby the upper end of the device may be held in temporarily fixed relation to the vessel to avoid the necessity of manually supporting the same while in operation. Such means includes the strip 32 centrally formed with an offset portion 33 shaped to partly encircle the power rod immediately above the tubular section, a latching member 34 engaging the rod in opposition to the portion 33 and fixing the supporting means to the rod in a conveniently separable manner. The ends of the section 32 are formed with clamp members 35 to engage the edge of the vessel, and said section 32 is of such material that the lengths projecting from the rod engaging portion 33 may be bent at any desired angle to such portion, whereby the supporting means may be arranged to accommodate itself to vessels of different diameters.

In Fig. 6, I have shown a blank from which the disk plates are constructed, this illustration being intended to indicate the simplicity and cheapness of this portion of the structure. It will be noted that the plates are stamped from the blank in circular form and that the ears 5 are arranged in two diametrically opposite pairs, so that the waste of material is maintained at the minimum.

The apparatus is particularly effective with fresh cream, and after separation of the butter fats as described, the resultant milk product may be drawn off in any convenient way, and will be found to be thoroughly fresh and sweet and capable of any and all uses to which the ordinary milk product of the separator is adapted. After drawing off the milk product the butter fats which then appear in comparatively fine globular form may be effectively salted by adding thereto salt water solution and thoroughly impregnating said butter fats by several turns of the apparatus. Any desired coloring matter may be used in the usual way, and the butter fats after removal from the vessel pressed into desired form in the manner incident to butter manufacture.

The salient feature of the present invention resides in the aerating member, which, through the peculiar formation of the plates tends to a rapid aeration of the material and a consequent quick separation of the butter fats. Another and most important feature from a commercial standpoint is the simplicity of the structure and the ease with which it may be operated and effectively handled by anyone whether skilled in the working of butter or not. The few parts of which the device is constructed enable it to be manufactured at a low cost, and the construction and arrangement of such parts, particularly in their convenient separation and assembling without the use of tools or mechanical knowledge establish the device essentially for home use, as neither skill nor knowledge of butter making are required for its successful operation. Furthermore, the ready separation of its various parts renders it highly sanitary in that it may be taken wholly apart, cleaned, and assembled by anyone without loss of time.

It is to be understood that I contemplate the construction of the parts of any desired material, preferring however, the use of aluminum or the like for those parts coming in direct contact with the cream. The device may also be made in various sizes in accordance with the quantity of material to be churned at any one time.

What is claimed is:—

1. A churn apparatus including an aerating member comprising spaced plates, each plate being formed with alternate depressed and elevated portions, and means for connecting the plates in fixed relation.

2. A churn apparatus including an aerating member comprising spaced superimposed plates, each plate being formed with alternate depressions and elevations, and means for connecting the plates with the depressions of one vertically opposite the elevations of the other.

3. A churn apparatus including an aerating member having a central chamber, said chamber having an edge opening formed to alternately present widened and narrowed passages, a sleeve secured to the member and in open communication with the chamber, and a tubular section secured to the sleeve and formed with an inlet opening, said section being closed against the direct admission of the material in the churn.

4. A churn apparatus including an aerating member having a central chamber, said chamber having an edge opening formed to alternately present widened and narrowed passages, a sleeve removably secured to the member and in open communication with the chamber, and a tubular section removably secured to the sleeve and formed with an inlet opening, said section being closed against the direct admission of the material in the churn.

5. A churn apparatus including an aerating member comprising spaced plates each formed with alternately depressed and elevated portions, a means carried by the free edges of the plates for connecting said plates in fixed relation.

6. A churn apparatus including an aerating member comprising spaced plates each formed with alternately depressed and elevated portions, and ears projecting from the respective plates and adapted to be connected together to secure the plates in fixed relation.

In testimony whereof I affix my signature in presence of two witnesses.

THOMAS BERNTSON.

Witnesses:
DAVID W. GOULD,
BENNETT S. JONES.